United States Patent [19]

Neidhardt

[11] Patent Number: 4,973,905
[45] Date of Patent: Nov. 27, 1990

[54] EDDY CURRENT MEASURING DEVICE WITH FLUX RETURN ELEMENT

[75] Inventor: Klaus-Jürgen Neidhardt, Frankfurt, Fed. Rep. of Germany

[73] Assignee: VDO Adolf Schindling AG, Frankfurt am Main, Fed. Rep. of Germany

[21] Appl. No.: 380,905

[22] Filed: Jul. 14, 1989

[30] Foreign Application Priority Data

Nov. 24, 1988 [DE] Fed. Rep. of Germany ....... 3839547

[51] Int. Cl.5 ............................................. G01P 3/495
[52] U.S. Cl. ..................................... 324/164; 73/519
[58] Field of Search ............... 324/164, 165, 125, 137, 324/154 P; 384/446; 73/497, 519, 520

[56] References Cited

U.S. PATENT DOCUMENTS

| | | | |
|---|---|---|---|
| 4,143,538 | 3/1979 | Karsh et al. | 324/164 X |
| 4,186,609 | 2/1980 | Baermann | 324/164 X |
| 4,371,834 | 2/1983 | Bezard et al. | 324/164 X |

FOREIGN PATENT DOCUMENTS

| | | | |
|---|---|---|---|
| 1063412 | 8/1959 | Fed. Rep. of Germany | 324/164 |
| 2228863 | 12/1972 | Fed. Rep. of Germany | 324/164 |
| 2223982 | 8/1980 | Fed. Rep. of Germany | 324/164 |
| 233662 | 3/1986 | Fed. Rep. of Germany | 324/164 |
| 594040 | 9/1925 | France | 324/164 |
| 594041 | 9/1925 | France | 324/164 |
| 50771 | 3/1966 | Poland | 324/164 |
| 1437054 | 5/1976 | United Kingdom | 324/164 |

Primary Examiner—Reinhard J. Eisenzopf
Assistant Examiner—Warren S. Edmonds
Attorney, Agent, or Firm—Martin A. Farber

[57] ABSTRACT

In an eddy-current measuring device, a permanent magnet (2) which is arranged fixed for rotation on a drive shaft (1) is magnetized axially. An eddy-current element (4) has the shaped of a disk and is located with slight axial spacing from the permanent magnet (2) on a pointer shaft (3). On the top of the eddy-current element (4) and below the permanent magnet (2), a congruent flux return element (8,9) is provided in each case.

3 Claims, 1 Drawing Sheet

EDDY CURRENT MEASURING DEVICE WITH FLUX RETURN ELEMENT

FIELD AND BACKGROUND OF THE INVENTION

The present invention relates to an eddy-current measuring device, in particular a tachometer, which has a permanent magnet in the shape of a circular disk, the disk being positioned fixed for rotation on a drive shaft and, wherein at a slight distance from the disk, an eddy-current element of electrically conductive material is disposed fixed for rotation on a pointer shaft and, located behind the disk, there is a return element consisting of a magnetic material.

Such eddy-current measuring devices are generally known and used as tachometers in motor vehicles.

In the known devices of the above type the eddy-current element is developed as a bell which grips over a permanent magnet. The return element in the form of a stationary ring, and is arranged radially behind the bell. The permanent magnet is magnetized radially in order to produce eddy-currents in the eddy-current element.

The bell-shaped development of the eddy-current element provides the advantage that the gap width between eddy-current element and permanent magnet is constant at all times regardless of axial tolerances. However, the known measuring device has the disadvantage that it is of relatively large volume in radial direction since two structural parts grip with a spacing over the permanent magnet.

SUMMARY OF THE INVENTION

It is an object of the invention so to develop an eddy-current measuring device of the aforementioned type that is as compact as possible, while being insensitive to mechanical tolerances.

According to the invention, the permanent magnet (2) is magnetized axially and the eddy-current element (4) is also developed as a circular disk and arranged on a pointer shaft (3) at a slight axial distance from the end surface of the permanent magnet (2).

By this development, the diameter of the measuring device is determined by the diameter of the permanent magnet. Therefore the eddy-current measuring device is substantially more compact in radial direction than the previously known measuring device with radial magnetization and an eddy-current bell. Since the pointer shaft can be supported on the end surface of the drive shaft, as is also customary in comparable measuring elements, there are no disturbing tolerances by which undesired variations in spacing between eddy-current member and permanent magnet arise.

The invention can, of course, also be reduced to practice if, in kinematic reversal of the foregoing conditions, the permanent magnet is provided on the pointer shaft and the eddy-current member on the drive shaft.

One advantageous embodiment of the invention includes a return element (8) which is disposed on the eddy-current element (4) on the side of the eddy-current element (4) which faces away from the permanent magnet (2). With this development the return element is not arranged fixed in space but firmly attached to the eddy-current element. In this way the magnetic field attracts its return member together with the eddy-current element in the direction of the permanent magnet so that these parts are held together by magnetic forces and there cannot be any variation in the spacing between permanent magnet and eddy-current element.

The permanent magnet is completely encapsulated in axial direction by iron parts, so that the eddy-current measuring element operates particularly effectively if, in accordance with a further embodiment of the invention, a further return element (9) is located on the side of the permanent magnet (2) facing away from the eddy-current element (4).

The influence of the increasing electrical resistance of

The influence of the increasing electrical resistance of the eddy-current element with an increase in temperature can be temperature-compensated in simple manner by placing on the side of the permanent magnet (2) facing the eddy-current element (4) a compensation ring (10) of a material the magnetic resistance of which increases with an increase in temperature.

The eddy-current measuring device can be used, in addition to its function as tachometer, also in order to produce a speed-proportional signal if the permanent magnet (2) has at least one lug (11,12) which is directed radially outward and moveable past a magnetic field sensor (13). The signals of the magnetic field sensor can, for instance, be fed to a travel-speed control, a volume control of an automobile radio or an on-board computer.

BRIEF DESCRIPTION OF THE DRAWING

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENT

Figure 1:
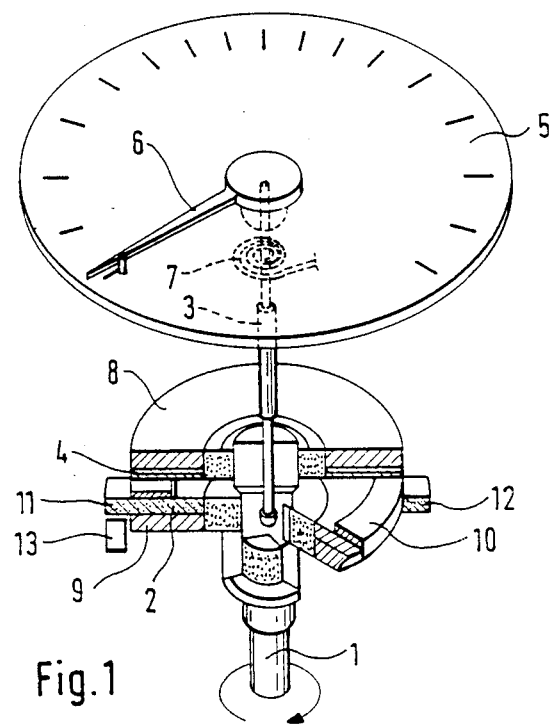
FIG. 1 is a perspective view of a measuring element according to the invention, shown partially in section.

FIG. 1 shows a drive shaft 1 which is driven as a function of the speed in customary manner in a motor vehicle. Fixed for rotation on this drive shaft 1 there is a permanent magnet 2 in the shape of a circular disk which is magnetized in axial direction. Supported on the end of the drive shaft 1 is a pointer shaft 3 which holds, with a slight axial spacing from the permanent magnet 2, an eddy-current element 4 of electrically conductive material, generally copper or aluminum. This eddy-current element 4 is also developed as a circular disk.

The pointer shaft 3 passes through a dial 5 and bears a pointer 6 above said dial 5. An ordinary return spring 7 urges the pointer shaft 3 into the zero position.

On the eddy-current element 4 there is disposed an iron magnetic-flux return element 8 which is congruent with it. A corresponding flux return element 9 is provided below the permanent magnet 2. In order to compensate for the influences of temperature, a compensation ring 10 consisting of a nickel alloy is arranged on the front surface of the permanent magnet 2 facing the eddy-current element 4.

In order to be able to use the measuring element also for the obtaining of signals which are dependent on the speed, the permanent magnet 2 has two radially outward extending lugs (11,12) which, upon rotation of the drive shaft 1 and the permanent magnet 2, move over a magnetic field sensor 13, allowing the sensor 13 to produce the desired signals.

Figure 2:
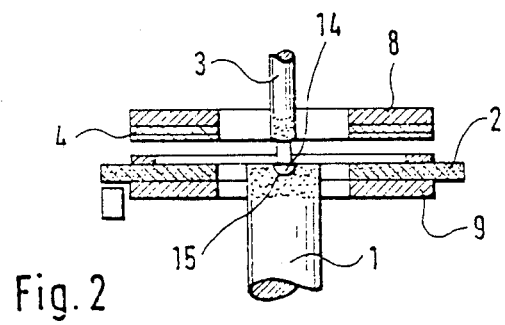
FIG. 2 is a vertical section through a lower region of the measuring element.

FIG. 2 shows more clearly how the pointer shaft 3 rests via its spherical head 14 in a depression 15 on the front surface of the drive shaft 1. The magnetic forces produced by the permanent magnet 2 on the return ring 8 maintain the ball head 14 held by axial forces in a depression 15 of the shaft 1.

I claim:

1. An eddy-current measuring device suitable for use as a tachometer, comprising
    a permanent magnet, a drive shaft, an eddy-current element, a pointer shaft extending beyond the drive shaft, and a return flux element of magnetic material; and wherein
    the permanent magnet has the shape of a circular disk and is positioned fixed for rotation on the drive shaft;
    the eddy-current element comprises electrically conductive nonmagnetic material, is formed as a circular disk positioned spaced apart from and alongside the permanent magnet disk, and is fixed for rotation on the pointer shaft;
    the return flux element is located alongside the eddy-current element on a side thereof opposite the magnet;
    the permanent magnet is magnetized axially; and
    said return element is disposed on and fixed to the eddy-current element for rotation with the eddy current element.

2. A measuring device according to claim 1, further comprising
    a further flux return element which is located on a side of the permanent magnet facing away from the eddy-current element.

3. A measuring device according to claim 1, further comprising
    a magnetic field sensor; and wherein
    said permanent magnet has at least one lug which is directed radially outward and movable past the magnetic field sensor.

* * * * *